(12) United States Patent
Dinn et al.

(10) Patent No.: US 12,609,310 B2
(45) Date of Patent: Apr. 21, 2026

---

(54) IMPURITY REMOVAL FROM AN INTERMEDIATE PRODUCT OBTAINED FROM Ca/Na/Li HYPOCHLORITE DELITHIATION PROCESS

(71) Applicant: BASF Corporation, Florham Park, NJ (US)

(72) Inventors: Tinoush Dinn, Beachwood, OH (US); Dieter G. Von Deak, Solon, OH (US); William C. Mays, Southfield, MI (US); Martin Lawrence Panchula, Beachwood, OH (US)

(73) Assignee: BASF CORPORATION, Florham Park, NJ (US)

( * ) Notice: Subject to any disclaimer, the term of this patent is extended or adjusted under 35 U.S.C. 154(b) by 325 days.

(21) Appl. No.: 18/392,857

(22) Filed: Dec. 21, 2023

(65) Prior Publication Data

US 2024/0222620 A1     Jul. 4, 2024

Related U.S. Application Data

(60) Provisional application No. 63/477,663, filed on Dec. 29, 2022.

(51) Int. Cl.
*H01M 4/525* (2010.01)
*C01G 53/42* (2025.01)

(52) U.S. Cl.
CPC ............ *H01M 4/525* (2013.01); *C01G 53/42* (2013.01); *C01P 2002/50* (2013.01); *C01P*

*2002/72* (2013.01); *C01P 2006/11* (2013.01); *C01P 2006/40* (2013.01)

(58) Field of Classification Search
CPC ......... H01M 4/525; Y02E 60/10; C01G 53/42
See application file for complete search history.

(56) References Cited

FOREIGN PATENT DOCUMENTS

| CN | 101584058 A | * 11/2009 | ............. B08B 3/022 |
| EP | 3621923 B1 | 3/2021 | |
| WO | 2021/183094 A1 | 9/2021 | |

OTHER PUBLICATIONS

J.R. Dean, *Practical Inductively Coupled Plasma Spectroscopy*, Chichester, England: Wiley, 2005, 65-87.
Welz and Sperling, *Atomic Absorption Spectrometry*, 3rd ed., Weinheim, Germany: Wiley VCH, 1999, 221-294.
H. Arai et al. (*Electrochimica Acta* 50 (2005) 1821-1828.

* cited by examiner

*Primary Examiner* — Khanh T Nguyen
(74) *Attorney, Agent, or Firm* — Peter DiMauro

(57) ABSTRACT

Disclosed is a process for removing impurities from an intermediate product in battery material production including a) contacting a first intermediate product with a first aqueous medium to obtain a second intermediate product; and b) contacting the second intermediate product with a stream of a second aqueous medium until a conductivity of the stream of the second aqueous medium after contacting the second intermediate product is below about 1,000 micro-Siemens per centimeter ($\mu$S/cm).

17 Claims, 4 Drawing Sheets

IMPURITY REMOVAL FROM AN INTERMEDIATE PRODUCT OBTAINED FROM Ca/Na/Li HYPOCHLORITE DELITHIATION PROCESS

TECHNICAL FIELD

The disclosure relates to processes for reducing impurities from an intermediate product in battery material production. More specifically, the disclosure in some aspects relates to processes for treating a delithiated lithium nickel oxide (DLNO) material obtained from delithiation of a lithium nickel oxide (e.g. LiNiO2) material to remove mono or multi-valent ion impurities.

BACKGROUND

Lithium-ion batteries are increasingly used in essential applications such as powering electric vehicles, cellular telephones, and cameras. The formation of a battery material for use in batteries typically involves two primary steps. First, a precursor can be formed by co-precipitation reactions whereby transition metals can be intermixed in the form of hydroxides or carbonates to form a precursor powder. This precursor powder can then be mixed with a lithium compound and calcined under high temperature to form an electrochemically active composition. During the formation of the battery material, according to traditional processes, the electrochemically active composition can be subjected to delithiation to remove lithium present within the electrochemically active composition while maintaining the crystal arrangement of the other elements in the material, to form a delithiated electrochemically active composition. This allows the resulting delithiated electrochemically active material to be incorporated into "charged" electrochemical cells as a cathode active material.

Prior processes for achieving this delithiation of the electrochemically active composition suffered several drawbacks such as relatively high levels of mono or multi-valent ion impurities. As such, improved processes are needed for the manufacture of electrochemically active compositions for their use in electrochemical cells.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

In one or more embodiments, a process for removing impurities from an intermediate product in battery material production, can include a) contacting a first intermediate product with a first aqueous medium to obtain a second intermediate product, wherein the amount of the first aqueous medium has a mass from about 0.1 to 15 times the mass of the first intermediate product; and b) contacting the second intermediate product with a stream of a second aqueous medium until a conductivity of the stream of the second aqueous medium after contacting the second intermediate product is below about 1,000 micro-Siemens per centimeter (μS/cm), to form a washed intermediate product; wherein the first intermediate product is obtained from a Ca/Na/Li hypochlorite delithiation process, the impurities include mono or multi-valent ions including calcium, magnesium, sodium, chloride, chlorite, and/or chlorate, and the battery material includes $K_yLi_xNi_zO2$ wherein y can range from about 0 to 0.3, x can range from about 0 to 0.2, z can range from about 0.1 to 1, and x+y can range from about 0 to 0.5.

DETAILED DESCRIPTION

Figure 1:
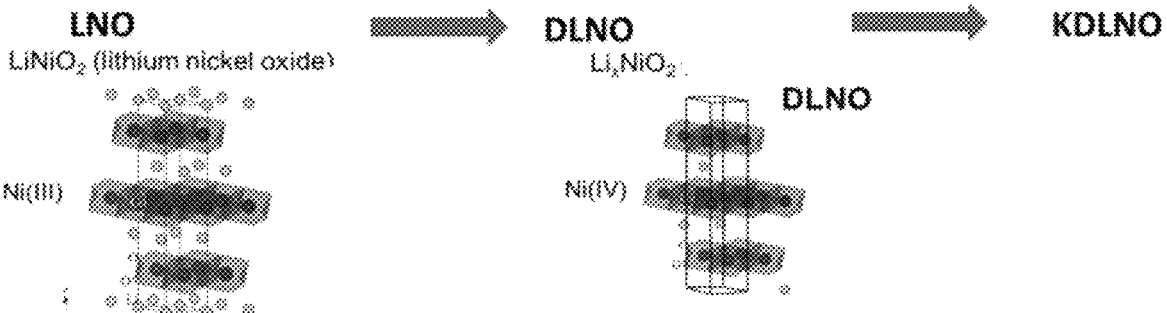
FIG. 1 shows an exemplary process of the production of battery material.

It is to be understood that the following disclosure describes several exemplary embodiments for implementing different features, structures, and/or functions of the invention. Exemplary embodiments of components, arrangement, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments can be used in any other exemplary embodiments, without departing from the scope of the disclosure.

The present disclosure is directed to processes for removing impurities from delithiated electrochemically active composition(s). These delithiated electrochemically active composition can include intermediate products of material suitable for use as battery material in an electrochemical cell, such as one or more cells within a primary or secondary battery. Provided are cost effective processes for removing impurities from the delithiated electrochemically active compositions including delithiated metal oxides, illustratively delithiated nickel oxides.

In one or more embodiments, the generation of battery material can begin with calcination of a lithium compound and a transition metal compound, a rare earth compound, or combinations thereof. The lithium compound can be lithium hydroxide and the transition metal compound can be Ni, resulting in LNO (Lithium nickel oxide) as an active material precursor of the battery material.

As used herein, the term "lithium compound" refers to a lithium containing composition in the form of a lithium hydroxide, lithium oxide, lithium carbonate, lithium nitrate, lithium sulfate, lithium acetate, lithium peroxide, lithium hydrogen carbonate, or a lithium halide.

As used herein, the term "active material precursor" refers to a product of an intermixing between a lithium compound, a transition metal precursor, and in some aspects a processing additive.

As used herein, the term "calcination" refers to a thermal treatment in the presence of an oxidizing atmosphere so as to cause a chemical transformation of a material.

As used herein, the term "electrochemically active composition" refers to an active material precursor that has been subjected to calcination.

As used herein, the term "delithiated electrochemically active composition" refers to an electrochemically active composition that has been subjected to a delithiation process. An example of a delithiated electrochemically active composition can include delithiated LiNiMO, which is referred to herein as "DLNO".

A "delithiation process" can include a process which decreases the lithium atomic percent (at %) on a metals basis. In one or more examples, the delithiation process can be a Ca/Na/Li hypochlorite delithiation process. One or more exemplary delithiation techniques are disclosed in WO2021183094, incorporated herein by reference in its entirety.

Illustrative examples of electrochemically active compositions can include, but are not limited to, chemistries based on LiNiMO where M is optional in the material and can be any transition metal, rare earth element, or combinations thereof. While much of the present disclosure is directed to delithiated electrochemically active compositions such as those that are predominantly Ni on an atomic basis, it is appreciated that the processes of forming of these materials in a charged state are equally attributable to other electrochemically active compositions as well.

A process for removing lithium from an electrochemically active composition can include, providing an electrochemically active composition, combining the electrochemically active composition with a strong oxidizer or acid wash for a lithium removal time, and thereby forming a delithiated electrochemically active composition. Briefly, a delithiation process may include combining an electrochemically active composition defined by the formula of $LiMO_2$ where M can be optionally one or more metals, transition metals, rare earth metals or combinations thereof, with a strong oxidizer for a lithium removal time, wherein the lithium removal time can be such that a Li/M at % ratio following the lithium removal time can be less than the initial Li/M at % ratio, thereby a delithiated electrochemically active composition can be formed. A strong oxidizer can include one or more of a hypochlorite salt, chlorite salt, chlorate salt, perchlorate salt, hydrogen peroxide, chlorine, hypochlorous acid, or ozone.

The delithiated electrochemically active composition after being subjected to a delithiation process or processes can include those compositions falling under the formula $Li_xM_zO_2$ where x is the atomic ratio of Li and is typically from 0 to 0.2, z is the atomic ratio of M and ranges from 0.1 to 1, and M is one or more of Co, Ni, Mn, Al, Mg, Ti, Zr, Nb, Hf, V, Cr, Sn, Cu, Mo, W, Fe, Si, Zn, B, other transition metals, a rare earth element, or combinations thereof. In examples, M can be or include 1, 2, 3, 4, 5 or more of the foregoing list. In one or more embodiments, M is at least Ni and the composition can be a DLNO composition that includes Li, Ni, and O, alone or further optionally with one or more additional elements. The process for removing impurities as described herein can be used on any electrochemically active composition suitable for use as a cathode active material in a primary or secondary electrochemical cell.

The atomic ratio of Li can be measured by any process known in the art. An illustrative example can include inductively coupled plasma atomic emission spectroscopy (ICP) or atomic absorption spectroscopy as described by J. R. Dean {Practical Inductively Coupled Plasma Spectroscopy, Chichester, England: Wiley, 2005, 65-87) and Welz and Sperling {Atomic Absorption Spectrometry, 3rd ed., Weinheim, Germany: Wiley VCH, 1999, 221-294). The chemical composition of compositions can be examined by a Varian Liberty 100 inductively-coupled plasma (ICP) system.

The delithiated electrochemically active composition can include Ni and one or more additives. The delithiated electrochemically active composition can include Ni at an atomic percentage (at %) relative to the total metals in the delithiated electrochemically active composition of 10 at % or greater, optionally 2⊖ at % or greater, optionally 30 at % or greater, optionally 40 at % or greater, optionally 50 at % or greater, optionally 60 at % or greater, optionally 70 at % or greater, optionally 80 at % or greater, optionally 90 at % or greater, optionally 95 at % or greater, optionally 96 at % or greater, optionally 97 at % or greater, optionally 98 at % or greater, optionally 99 at % or greater, optionally 100 at %. Optionally, the atomic percentage of Ni can be from 70 at % to 99 at % or greater. Optionally, the atomic percentage of Ni can be from 80 at % to 99 at % or greater. Optionally, the atomic percentage of Ni can be from 90 at % to 99 at % or greater. Optionally, Ni can be the only transition metal designed in or present in the delithiated electrochemically active composition such that Ni can be present at substantially 100 at %.

Optionally, a delithiated electrochemically active composition can include Ni and one or more other transition metals. One or more other transition metals (other than Ni) can optionally each be individually present at 0 at % to 90 at %, optionally 1 at % to 90 at %. Optionally, one or more other transition metals can each individually be present at 0 at % to 50 at %, optionally 1 at % to 50 at %. Optionally, one or more other transition metals can each individually be present at 1 at % to 30 at %, optionally 1 at % to 2⊖ at %, optionally 1 at % to 10 at %, 1 at % to 7 at %, 1 at % to 5 at %, 2 at % to 2⊖ at %, 5 at % to 2⊖ at %, 10 at % to 2⊖ at %. Optionally, 1, 2, 3, or more other transition metals other than Ni can be present in an electrochemically active composition.

A delithiated electrochemically active composition, such as DLNO, has a particle size. Particle size is defined as Dv50, which is a diameter of a particle such that about 50% of a sample's mass is smaller than and about 50% of a sample's mass is larger than the Dv50, assuming particle density is uniform and not a function of size. Optionally, a particle size can be from about 1 μm to about 2⊖ μm or any value or range therebetween. Optionally, a particle size can be from about 1-15 μm, optionally from about 1-10 μm, optionally from about 1-7 μm, optionally from about 4-7 μm, optionally from about 4-6 μm. Particle size can be measured by techniques known in the art, for example, laser diffraction particle size analysis. Laser diffraction particle size analysis can measure particle size distributions by measuring the angular variation in intensity of light scattered as a laser beam passes through a dispersed particulate sample. Large particles scatter light at small angles relative to the laser beam and small particles scatter light at relatively large angles. The angular scattering intensity data can then be analyzed to calculate the size of the particles responsible for creating the scattering pattern, using the Mie theory of light scattering. The particle size can be reported as a volume equivalent sphere diameter.

Oftentimes, a delithiated electrochemically active composition that has been subjected to delithiation, such as DLNO, can be too chemically reactive for direct use as a battery material in battery cells. Therefore, the delithiated electrochemically active composition can be subjected to stabilization treatment. In such cases, the delithiated electrochemically active composition before stabilization processing can be referred to "a first intermediate product in a battery material" or "a second intermediate product in a battery material." The stabilized material is referred to as the "battery material."

In an example as shown in FIG. 1, the conversion of LNO as an exemplary active material precursor to battery material (e.g. KDLNO) can begin with the treatment of LNO with an aqueous oxidation process which causes the Ni(III) to partially oxidize to Ni(IV) and can effectively substantially delithiate the LNO, thereby forming DLNO (delithiated nickel oxide) as a first intermediate product. To stabilize the intermediate product for direct use in battery cells, the intermediate product can be partially stabilized (reduced) by exposing the intermediate product to KOH, thereby forming potassium stabilized delithiated nickel oxide ("KDLNO"). This KDLNO can be suitable for use as a battery material as well as for other uses.

The sequence and approximate chemical formulas of the material in the various stages are shown below:

LNO-LiNiO$_2$(Nickel oxidation state is from about 2.9 to 3.0)

DLNO-Li$_x$Ni$_z$O$_2$(Nickel oxidation state is from about 3.7 to 4.0)

KDLNO-K$_y$Li$_x$Ni$_z$O$_2$(Nickel oxidation state if from about 3.5 to 4.0);

wherein y can range from about 0 to 0.3, x can range from about 0 to 0.2, z can range from about 0.1 to 1, and x+y can range from about 0 to 0.5. Impurities present in the first or second intermediate product (e.g., DLNO) can be undesirably included in the battery material. For example, the impurities can include mono or multi-valent ions including calcium, magnesium, sodium, chloride, chlorite, chlorate and/or combinations thereof. In some examples, the impurities can be one or more of calcium, sodium, magnesium, and/or chloride.

It can be advantageous to remove impurities from the first and/or second intermediate product of a battery material. Aspects of this disclosure provide effective processes for removing impurities from the intermediate product in a battery material production.

In aspects of this disclosure, a process for removing impurities from an intermediate product in battery material production can include:

a) contacting a first intermediate product with a first aqueous medium to obtain a second intermediate product;

b) contacting the second intermediate product with a stream of a second aqueous medium until a conductivity of the stream of the second aqueous medium after contacting the second intermediate product is below about 1,000 micro-Siemens per centimeter (μS/cm), to form a washed intermediate product.

The first intermediate product can be obtained from a Ca/Na/Li hypochlorite delithiation process. The step of a), of contacting the first intermediate product with a first aqueous medium to obtain a second intermediate product; and/or step b), of contacting the second intermediate product with a stream of a second aqueous medium; can be performed as a reslurry wash and displacement cake wash.

In a reslurry wash, solids of an intermediate product can be (1) separated from an aqueous slurry including the intermediate product and an acidic solution or a mother liquor (such as by filtering), (2) reslurried again by resuspending the solid with an aqueous medium and (3) filtered to remove excess aqueous medium to obtain a filter cake. The resulting cake is a washed intermediate product.

In a displacement cake wash, solids of a first intermediate product obtained from a delithiation process can be filtered from an aqueous slurry including the first intermediate product and the mother liquor to obtain a filter cake, then the first aqueous medium and second aqueous medium can be sequentially passed through the filter cake or a solid bed. The resulting cake is a washed intermediate product.

Optionally, the filter cake obtained after a reslurry wash can be further washed with a displacement cake wash to obtain a washed intermediate product. In both the reslurry wash and displacement cake wash, the washed intermediate product can be obtained in the form of a filter cake. Optionally, the cake can be subjected to cake squeezing or dewatering to remove excess aqueous medium.

In a reslurry wash or displacement cake wash, the process for separating solids form an intermediate product from an aqueous slurry including the intermediate product and the mother liquor can include filtering the intermediate product from the aqueous slurry using a membrane filter press with an inlet gauge pressure ranging from about 0.1 bar to about 7 bar, 0.05 bar to about 4.5 bar, 0 bar to about 3 bar, 0.5 bar to about 4 bar, 1 bar to about 3 bar or, or any gauge pressure therebetween.

Optionally, the step of a) of contacting the first intermediate product with a first aqueous medium can be repeated one, two, three, four, five or more additional times as desired to further remove impurities. If the first intermediate product is resubjected to step (a), the first intermediate product can be present at a weight % by total weight of the first intermediate product and the aqueous medium that is less than a corresponding weight % for an initial step (a). Alternatively, at a resubjecting step (a), the first intermediate product can be present at a weight % by total weight of the first intermediate product and the aqueous medium that is greater than a corresponding weight % for an initial step (a).

In some aspects, the process of this disclosure can include repeating at least step a) if the washed intermediate product contains more than about 500 ppm of impurities, more than about 400 ppm of impurities, more than about 300 ppm of impurities, more than about 200 ppm of impurities or more than about 100 ppm of impurities.

As impurities can include mono or multi-valent ions, the amount of impurities in the first intermediate product can be measured by determining the electrical conductivity of the liquid that has been in contact with the first intermediate product. Conductivity is a measure of the ability of an aqueous solution to pass an electrical current and is affected by presence of inorganic dissolved ions. Conductivity can be measured with a probe and a meter. A probe can be immersed in the sample or flow and voltage can be applied between two electrodes in the probe. The resistance of the aqueous solution can cause the voltage to drop which can be used to calculate the conductivity per centimeter. The meter can convert the probe measurement to micro-Siemens per centimeter (μS/cm).

The process of this disclosure can include repeating at least step a) if the conductivity of the aqueous medium after contact with the first intermediate product is outside a desired range. A conductivity measurement of the stream of the aqueous medium after contact with the first intermediate product in the step a) of contacting the first intermediate product with a first aqueous medium can be between about 800 micro-Siemens per centimeter and about 200 micro-Siemens per centimeter. In some examples, the conductivity of the aqueous medium after contact with the first intermediate product after the step a) of contacting the first intermediate product with a first aqueous medium can be about 800 micro-Siemens per centimeter or less, about 750 micro-Siemens per centimeter or less, about 700 micro-Siemens per centimeter or less, about 650 micro-Siemens per centimeter or less, about 600 micro-Siemens per centimeter or less or about 500 micro-Siemens per centimeter or less. A suitable conductivity of the aqueous medium after contact with the first intermediate product after the step a) of contacting the first intermediate product with a first aqueous medium can be about 200 micro-Siemens per centimeter or more, about 225 micro-Siemens per centimeter or more, about 250 micro-Siemens per centimeter or more, about 275 micro-Siemens per centimeter or more, or about 300 micro-Siemens per centimeter or more.

After the step a) of contacting the first intermediate product with a first aqueous medium is completed, the preliminarily washed first intermediate product is referred to as the "second intermediate product." The second intermediate product can be subjected to additional contacting with a stream of a second aqueous medium in step b), which can be performed as a reslurry wash or displacement cake wash.

The step b) of contacting the second intermediate product with a stream of a second aqueous medium can be performed or repeated until a conductivity of the stream of the second aqueous medium after contacting the second intermediate product is below about 1,000 micro-Siemens per centimeter ($\mu$S/cm). In some examples, the conductivity of the stream of a second aqueous medium after contact with the second intermediate product after the step b) of contacting the second intermediate product with an aqueous medium can be about 1,000 micro-Siemens per centimeter or less, about 900 micro-Siemens per centimeter or less, about 800 micro-Siemens per centimeter or less, about 700 micro-Siemens per centimeter or less, about 600 micro-Siemens per centimeter or less or about 500 micro-Siemens per centimeter or less.

After the step b) of contacting the second intermediate product with a second aqueous medium is completed, the washed second intermediate product is referred to as the "washed intermediate product."

The first aqueous medium and/or second aqueous medium can include deionized water, an acidic aqueous medium or a combination thereof. Suitable acids for preparing an acidic aqueous medium can include but are not limited to HCl, $H_2SO_4$, acetic acid, nitric acid, phosphoric acid and others. The composition of the first aqueous medium and second aqueous mediums can be the same or different.

In the step a) of contacting the first intermediate product with a first aqueous medium and step b) of contacting the second intermediate product with a stream of a second aqueous medium, the first aqueous medium or second aqueous medium can have a pH ranging from about 0.5 to about 7.5. For example, the pH can be greater than about 0.5, or greater than about 0.75, or greater than about 1.0, or greater than about 1.5, or greater than about 2.0, or greater than about 2.5, or greater than about 3.0, or greater than about 4.0, or greater than about 5.0, or greater than about 6.0. Additionally, the pH of the first aqueous medium or second aqueous medium can be less than about 7.5, or less than about 7.25, or less than about 7.0, or less than about 6.5, or less than about 6.0, or less than about 5.5, or less than about 5.0, or less than about 4.0, or less than about 3.0, or less than about 2.0. The pH of the first aqueous medium and second aqueous mediums can be the same or different.

In the step a) of contacting the first intermediate product with a first aqueous medium to obtain a second intermediate product, the amount of the first aqueous medium can have a mass from about 0.1 to 15 times the mass of the first intermediate product. The amount of the first aqueous medium can have a mass from about 0.1 or more times, 0.5 or more times, 2 or more times, 2.5 or more times, 3 or more times, 4 or more times, or 5 or more times the mass of the first intermediate product. The amount of the first aqueous medium can have a mass from about 50 or less times, 12 or less times, 10 or less times, 9 or less times, 8.5 or less times, 8 or less times, 7.5 or less times, or 7 or less times the mass of the first intermediate product.

In the step a) of contacting the first intermediate product with a first aqueous medium and step b) of contacting the second intermediate product with a stream of a second aqueous medium, the first aqueous medium and second aqueous medium can have a temperature ranging from about 20° C. to about 85° C. For example, the temperature of the first aqueous medium and second aqueous medium can be about 20° C. or more, 25° C. or more, 30° C. or more, 35° C. or more, 40° C. or more, 50° C. or more or 60° C. or more. Additionally, the temperature of the first aqueous medium and second aqueous medium can be less than about 85° C., less than 80° C., less than 75° C., less than 60° C., less than 55° C., less than 45° C., or less than 40° C. The temperature of the first aqueous medium and second aqueous medium can be the same or different. The temperature of the first aqueous medium can be higher or lower than that of the second aqueous medium.

The washed intermediate product obtained from step b) can be further contacted with KOH to stabilize the delithiated electrochemically active composition and obtain a battery material suitable for use in battery manufacturing. In one or more examples, conversion of the DLNO into KDLNO can be accomplished by reacting the washed intermediate product with KOH following the methods of H. Arai et al. (Electrochimica Acta 50 (2005) 1821-1828), incorporated herein by reference, and resulting in crystal structures described in EP 3 621 923 B1, incorporated herein by reference.

The resulting battery material can be represented by the formula $K_yLi_xM_zO_2$, wherein y ranges from 0 to 0.3, x ranges from 0 to 0.2, z can range from about 0.1 to 1, and x+y ranges from about 0 to 0.5.

In one or more examples, y can be 0.05 or more, 0.1 or more, 0.15 or more, or 2.0 or more. In one or more examples, y can be 0.3 or less, 0.25 or less, or 0.2 or less. In one or more examples, x can be 0.05 or more, 0.1 or more, or 0.15 or more. In one or more examples, x can be 0.2 or less, 0.15 or less, or 0.1 or less. In one or more examples, z can be 0.1 or more, 0.15 or more, 0.2 or more, 0.25 or more, or 0.3 or more. In one or more examples, z can be 1 or less, 0.9 or less, 0.8 or less, 0.7 or less, or 0.5 or less.

In one or more examples, the battery material can include about 0.7 weight % lithium or more by total weight of the battery material. In other aspects, the battery material can include 0.75 weight % or more, 0.8 weight % or more, 0.85 weight % or more, or 0.9 weight % or more lithium by total weight of the battery material. In some aspects, the battery material can include about 1.1 weight % lithium or less by total weight of the battery material. In other aspects, the battery material can include about 1.05 weight % or less, 1.0 weight % or less, 0.95 weight % or less, or 0.9 weight % or less lithium by total weight of the battery material.

In one or more examples, the battery material can include about 50 weight % nickel or more by total weight of the battery material. In other aspects, the battery material can include about 55 weight % or more, 60 weight % or more, or 65 weight % or more nickel by total weight of the battery material. In some aspects, the battery material can include about 70 weight % nickel or less by total weight of the battery material. In other aspects, the battery material can include about 65 weight % or less, 60 weight % or less, or 55 weight % or less nickel by total weight of the battery material.

In one or more examples, the battery material can include about 2 weight % potassium or more by total weight of the battery material. In other examples, the battery material can include about 2.5 weight % or more, 3 weight % or more, or 4 weight % or more potassium by total weight of the battery material. In one or more examples, the battery material can include about 6 weight % potassium or less by total weight of the battery material. In other examples, the battery material can include about 5.5 weight % or less, 5 weight % or less, or 4 weight % or less potassium by total weight of the battery material.

The energy density of the battery material can be about 300 mAh/g to about 400 mAh/g. For example, the energy density of the battery material can be 310 mAh/g or greater, 315 mAh/g or greater, 320 mAh/g or greater, 325 mAh/g or greater, 330 mAh/g or greater, 335 mAh/g or greater, 340 mAh/g or greater, or 350 mAh/g or greater, or any combination thereof. For example, the energy density of the battery material can be 400 mAh/g or less, 395 mAh/g or greater, 390 mAh/g or less, 385 mAh/g or less, 380 mAh/g or less, 375 mAh/g or less, 370 mAh/g or less, or 365 mAh/g or less.

The battery material can be in the form of a filter cake having a dried tap density ranging from about 2 g/cm³ to 2.5 g/cm³. The dried tap density of the battery material can be about 2.0 g/cm³ or more, 2.05 g/cm³ or more, 2.1 g/cm³ or more, 2.15 g/cm³ or more, or 2.2 g/cm³ or more. The tap density of the battery material can be about 2.5 g/cm³ or less, 2.4 g/cm³ or less, 2.3 g/cm³ or less, 2.25 g/cm³ or less, or 2.2 g/cm³ or less.

Suitable techniques for measuring the tap density can include 1) weighing a 250 mL graduate cylinder: M1; 2) filling KDLNO samples in the graduate cylinder below the 250 mL line; 3) weighing the graduate cylinder+KDLNO powders: M2, and the mass of the KDLNO powders is M3=M2−M1; 4) measuring the KDLNO volume in the graduate cylinder after 2500 taps in the Quantachrome auto tap analyzer: V1. The tap density can be calculated by M3 divided by V1.

The battery material obtained by the processes of this disclosure and after stabilization with KOH can have a first x-ray diffraction peak intensity at a 2Θ of about 12.5° and a second x-ray diffraction peak intensity at a 2Θ of about 37.3° and a ratio of the first peak intensity to the second peak intensity ranges from 0.5:100 to 40:100, from 5:100 to 35:100; from 10:100 to 30:100, from 15:100 to 30:100, from 20:100 to 25:100.

The battery material obtained by the processes of this disclosure can have a third x-ray diffraction peak intensity at a 2Θ of about 18.5° and a ratio of the third peak intensity to the second peak intensity ranges from 10:100 to 40:100, from 5:100 to 35:100; from 10:100 to 30:100, from 15:100 to 30:100, from 20:100 to 25:100.

Suitable techniques for measuring the x-ray diffraction peak intensity can include powder X-ray diffraction (pXRD). pXRD is an analytical technique used to characterize the crystal lattice structure of a sample material, such as a crystalline powder. XRD analysis of a crystalline sample material results in a characteristic diffraction pattern consisting of peaks of varying intensities, widths, and diffraction angles (peak positions) corresponding to diffraction planes in the crystal structure of the sample material. XRD patterns can be measured with an X-ray diffractometer using CuKα radiation by standard processes described, for example, by B. D. Cullity and S. R. Stock, Element of X-ray Diffraction (3$^{rd}$ ed. 2001). A D-8 Advanced X-ray diffractometer, available from Bruker Corporation (Madison, Wisconsin, USA), can be used to complete powder CRD analysis on a sample material such as a non-stoichiometric KDLNO delithiated layered nickel oxide. The normalized intensity, along with peak position, can be used to compare the relative efficiency of diffraction associated with certain diffraction planes with the crystal lattice of a sample material. The resulting XRD pattern can be compared with known XRD patterns. Comparative XRD patterns can be generated from known pure or mixed sample materials. In addition, the resulting XRD pattern can be compared with known XRD patterns with, for example, the Powder Diffraction File (PDF) database, available from the International Centre for Diffraction Data (Newton Square, Pa. USA, or the Inorganic Crystal Structure Database (ICSD), available from FIZ Karlsruhe (Eggenstein-Leopoldshafen, Germany).

Various aspects of the present invention are illustrated by the following non limiting examples. The examples are for illustrative purposes and are not a limitation on any practice of the present invention. It will be understood that variations and modifications can be made without departing from the spirit and scope of the invention.

EXAMPLES

In the following examples, a first intermediate product of a battery material obtained from a delithiation process can be treated by processes of this disclosure to remove impurities.

Example 1: Displacement Wash

Figure 2:
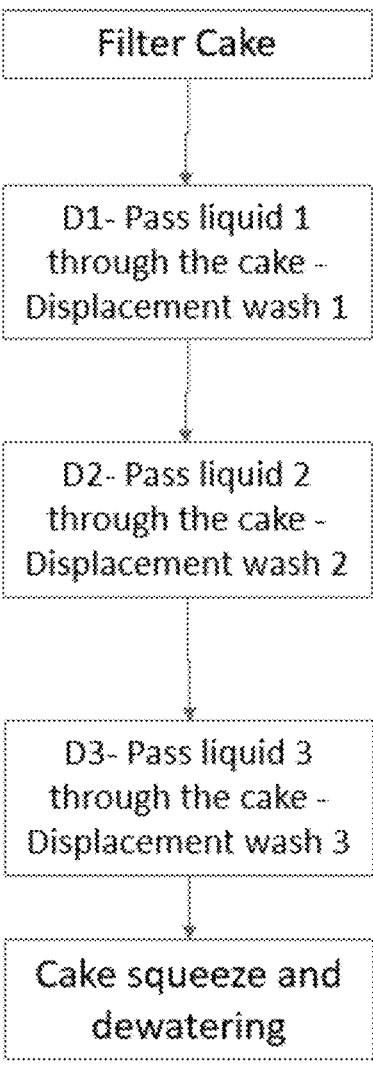
FIG. 2 shows an exemplary process of this disclosure.

As shown in FIG. 2, a filter cake including a first intermediate product can be obtained by separating the first intermediate product from an aqueous slurry including the intermediate product and the mother liquor. The filter cake may be mechanically squeezed with a pressure higher than filtration pressure (e.g. from about 0.5 to 1 bar gauge higher) in a certain duration (e.g. from about 10 to 30 minutes). Without removing the filter cake from the filter device and while the squeeze is held throughout the wash process, the cake can be subjected to a first contacting step (D1) by passing deionized (DI) water in an amount about 2 times the cake mass through the filter cake. The second contacting step (D2) can be performed by passing an acid wash having a pH of 0.5 or more through the filter cake in an amount about 2 times the cake mass on dry basis. In a third contacting step (D3), DI water can be passed through the filter cake in an amount and time sufficient to obtain a conductivity of 500 μS/cm.

Example 2: Displacement Wash

Figure 3:
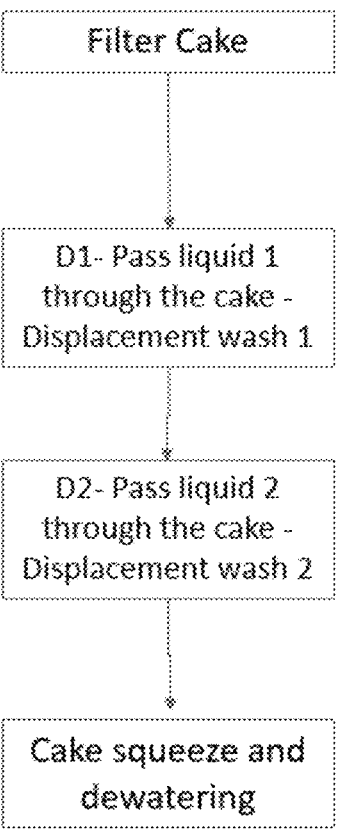
FIG. 3 shows another exemplary process of this disclosure.

As shown in FIG. 3, filter cake including a first intermediate product can be obtained by separating the first intermediate product from an aqueous slurry including the intermediate product and the mother liquor. The filter cake may be mechanically squeezed with a pressure higher than filtration pressure (e.g. 0.5 to 1 bar gauge higher) in a certain duration (e.g. 10 to 30 minutes). Without removing the filter cake from the filter device and while the squeeze is held throughout the wash process, the cake can be subjected to a first contacting step (D1) by passing an acid wash having a pH of 0.5 or more through the filter cake in an amount about 3 times the cake mass on dry basis. In a second contacting step (D2), DI water can be passed through the filter cake in an amount and time sufficient to obtain a conductivity of 800 µS/cm.

Example 3: Reslurry Wash

Figure 4:
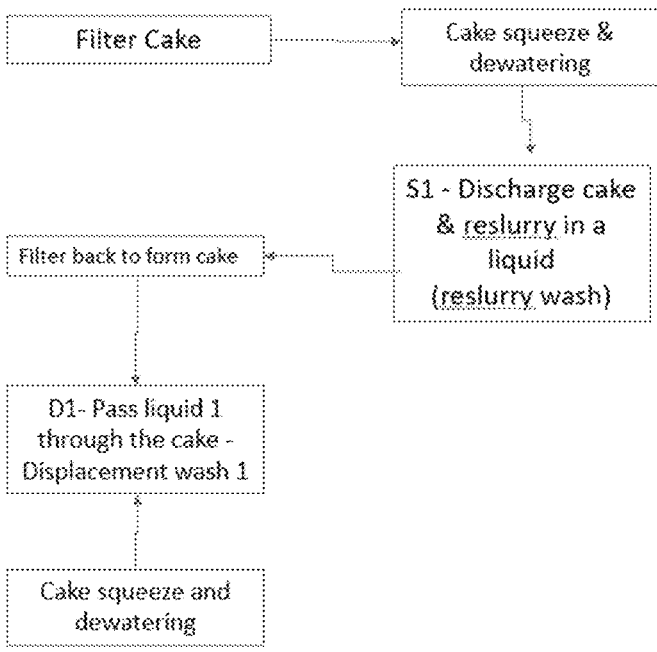
FIG. 4 shows yet another exemplary process of this disclosure.

As shown in FIG. 4, a filter cake including a first intermediate product can be obtained by separating the first intermediate product from an aqueous slurry including the intermediate product and the mother liquor. The filter cake may be mechanically squeezed with a pressure higher than filtration pressure (e.g. 0.5 to 1 bar gauge higher), and compressed air with pressures between 4 to 10 bar gauge passes and flowrate of between 0.01 to 1 scfm/ft$^2$ of filter area through the cake to partially remove the mother liquor in the cake. The filter cake can be discharged and resuspended (Si) in a first aqueous medium including an acid to obtain a slurry. The amount of first aqueous medium can be 9 times of the original cake mass on dry basis (10% wt.). Thereafter, the slurry can be filtered to form a cake as a second intermediate product. The filter cake may be mechanically squeezed with a pressure higher than filtration pressure (e.g. 0.5 to 1 bar gauge higher) in a certain duration e.g. 10 to 30 minutes. While the squeeze is held throughout the wash process, a displacement wash (D1) can be performed by passing deionized (DI) water through the filter cake without removing the filter cake from the filter material until the washed intermediate product has a conductivity of 800 µS/cm.

The present disclosure further relates to any one or more of the following numbered embodiments:

1. A process for removing impurities from an intermediate product in battery material production, the process including: a) contacting a first intermediate product with a first aqueous medium to obtain a second intermediate product, wherein the amount of the first aqueous medium has a mass from about 0.1 to 15 times the mass of the first intermediate product; and b) contacting the second intermediate product with a stream of a second aqueous medium until a conductivity of the stream of the second aqueous medium after contacting the second intermediate product is below about 1,000 micro-Siemens per centimeter (µS/cm), to form a washed intermediate product; wherein the first intermediate product is obtained from a Ca/Na/Li hypochlorite delithiation process, the impurities include mono or multi-valent ions including calcium, magnesium, sodium, chloride, chlorite, and/or chlorate, and the battery material includes $K_yLi_xNi_zO_2$ wherein y ranges from 0 to 0.3, x ranges from 0 to 0.2, z ranges from 0.1 to 1, and x+y ranges from about 0 to less than 0.5.

2. The process of paragraph 1, further including, repeating at least step (a) if the washed intermediate product contains more than 500 ppm calcium, sodium, magnesium, and/or chloride.

3. The process of paragraphs 1 or 2, wherein the first intermediate product is obtained by separating solids from an aqueous slurry including the first intermediate product and another liquor.

4. The process according to any of paragraph 1 to 3, wherein the separating step includes filtering the first intermediate product from the aqueous slurry using a membrane filter press with a gauge pressure ranging from about −0.1 bar to about 7 bar.

5. The process according to any of paragraph 1 to 4, wherein at least step (a) is repeated until the conductivity is between about 800 micro-Siemens per centimeter and about 200 micro-Siemens per centimeter.

6. The process according to any one of paragraphs 1 to 5, wherein the battery material has an energy density ranging from 300 mAh/g to 400 mAh/g.

7. The process according to any one of paragraphs 1 to 6, wherein the battery material includes from 0.7 weight % to 1.1 weight % lithium by total weight of the battery material, from 50 weight % to 70 weight % nickel by total weight of the battery material, and from 2 weight % to 6 weight % potassium by total weight of the battery material.

8. The process according to any one of paragraph 1 to 7, wherein the battery material has a tap density ranging from 2 g/cm$^3$ to 2.5 g/cm$^3$.

9. The process according to any one of paragraphs 1 to 8, wherein the battery material has a first x-ray diffraction peak intensity at a 2$\ominus$ of about 12.5° and a second x-ray diffraction peak intensity at a 2$\ominus$ of about 37.3° and a ratio of the first peak intensity to the second peak intensity ranges from 0.5:100 to 40:100.

10. The process according to any of paragraph 1 to 9, wherein the battery material has a third x-ray diffraction peak intensity at a 2$\ominus$ of about 18.5° and a ratio of the third peak intensity to the second peak intensity ranges from 10:100 to 40:100.

11. The process according to any one of paragraphs 1 to 10, wherein repeating steps (a) and (b) from one to five times.

12. The process according to any of paragraph 1 to 11, wherein, at a resubjecting step (a), the first intermediate product is present at a weight % by total weight of the first intermediate product and the aqueous medium that is less than a corresponding weight % for an initial step (a).

13. The process according to any of paragraph 1 to 12, wherein, at a resubjecting step (a), the first intermediate product is present at a weight % by total weight of the first intermediate product and the aqueous medium that is greater than a corresponding weight % for an initial step (a).

14. The process according to any of paragraph 1 to 13, wherein at least the first aqueous medium or second aqueous medium has a pH ranging from 0.5 to 7.5.

15. The process according to any of paragraph 1 to 14, wherein the at least the first aqueous medium or second aqueous medium have a temperature ranging from about 20° C. to about 85° C.

16. The process according to any of paragraph 1 to 15, further including filtering the washed intermediate product to obtain a filter cake.

17. The process according to any of paragraph 1 to 16, further including contacting the washed intermediate product with KOH to obtain the battery material.

The forgoing description of particular aspect(s) is merely exemplary in nature and is in no way intended to limit the scope of the invention, its application, or uses, which can, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials can be interchangeable such that the description of the invention can include multiple parts or steps arranged in many ways as is readily appreciated by one of skill in the art.

It will be understood that, although the terms "first," "second," "third" etc. may be used herein to describe various elements, components, regions, and/or steps, these elements, components, regions, layers, and/or steps should not be limited by these terms. These terms are only used to distinguish one element, component, region, layer, or section from another element, component, region, layer, or section. Thus, "a first element," "component," "region," "layer," or "section" discussed above could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/of" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits, and ranges appear in one or more claims below. All numerical values are "about" or "approximately" the indicated values, and take into account experimental error and variations that would be expected by a person having ordinary skill in the art.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

What is claimed is:

1. A process for removing impurities from an intermediate product in battery material production, the process comprising:
   a) contacting a first intermediate product with a first aqueous medium to obtain a second intermediate product;
   the amount of the first aqueous medium has a mass from about 0.1 to 15 times the mass of the first intermediate product;
   b) contacting the second intermediate product with a stream of a second aqueous medium until a conductivity of the stream of the second aqueous medium after contacting the second intermediate product is below about 1,000 micro-Siemens per centimeter ($\mu S/cm$), to form a washed intermediate product;
   wherein the first intermediate product is obtained from a Ca/Na/Li hypochlorite delithiation process;
   wherein, the impurities comprise mono or multi-valent ions including calcium, magnesium, sodium, chloride, chlorite, and/or chlorate; and
   wherein the battery material comprises $K_yLi_xNi_zO_2$ wherein y ranges from 0 to 0.3, x ranges from 0 to 0.2, z ranges from 0.1 to 1, and x+y ranges from about 0 to less than 0.5.

2. The process according to claim 1, further comprising, repeating at least step (a) if the washed intermediate product contains more than 500 ppm calcium, sodium, magnesium, and/or chloride.

3. The process according to claim 1, wherein the first intermediate product is obtained by separating solids from an aqueous slurry comprising the first intermediate product and a mother liquor.

4. The process according to claim 3, wherein the separating step comprises filtering the first intermediate product from the aqueous slurry using a membrane filter press with a gauge pressure ranging from about −0.1 bar to about 7 bar.

5. The process according to claim 1, wherein at least step (a) is repeated until the conductivity is between about 800 micro-Siemens per centimeter and about 200 micro-Siemens per centimeter.

6. The process according to claim 1, wherein the battery material has an energy density ranging from 300 mAh/g to 400 mAh/g.

7. The process according to claim 1, wherein the battery material comprises:
   from 0.7 weight % to 1.1 weight % lithium by total weight of the battery material,
   from 50 weight % to 70 weight % nickel by total weight of the battery material, and
   from 2 weight % to 6 weight % potassium by total weight of the battery material.

8. The process according to claim 1, wherein the battery material has a tap density ranging from 2 g/cm³ to 2.5 g/cm³.

9. The process according to claim 1, wherein the battery material has a first x-ray diffraction peak intensity at a $2\ominus$ of about 12.5° and a second x-ray diffraction peak intensity at a $2\ominus$ of about 37.3° and a ratio of the first peak intensity to the second peak intensity ranges from 0.5:100 to 40:100.

10. The process according to claim 9, wherein the battery material has a third x-ray diffraction peak intensity at a $2\ominus$ of about 18.5° and a ratio of the third peak intensity to the second peak intensity ranges from 10:100 to 40:100.

11. The process according to claim 1, wherein repeating steps (a) and (b) from one to five times.

12. The process according to claim 11, wherein, at a resubjecting step (a), the first intermediate product is present at a weight % by total weight of the first intermediate product and the aqueous medium that is less than a corresponding weight % for an initial step (a).

13. The process according to claim 12, wherein, at a resubjecting step (a), the first intermediate product is present at a weight % by total weight of the first intermediate product and the aqueous medium that is greater than a corresponding weight % for an initial step (a).

14. The process according to claim 1, wherein at least the first aqueous medium or second aqueous medium has a pH ranging from 0.5 to 7.5.

15. The process according to claim 1, wherein the at least the first aqueous medium or second aqueous medium have a temperature ranging from about 20° C. to about 85° C.

16. The process according to claim 1, further comprising filtering the washed intermediate product to obtain a filter cake.

17. The process according to claim 1, further comprising contacting the washed intermediate product with KOH to obtain the battery material.

* * * * *